US012651810B2

(12) United States Patent (10) Patent No.: US 12,651,810 B2
Gao et al. (45) Date of Patent: Jun. 9, 2026

(54) ELECTROCHEMICAL DEVICES WITH MULTIFUNCTIONAL ELECTRODE SEPARATOR ASSEMBLIES HAVING BUILT-IN REFERENCE ELECTRODES

(71) Applicant: GM GLOBAL TECHNOLOGY OPERATIONS LLC, Detroit, MI (US)

(72) Inventors: Jing Gao, Rochester, MI (US); Brian J. Koch, Berkley, MI (US); Zhe Li, Rochester, MI (US); Huaxin Li, Rochester Hills, MI (US); Anne Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 18/355,713

(22) Filed: Jul. 20, 2023

(65) Prior Publication Data

US 2025/0030134 A1 Jan. 23, 2025

(51) Int. Cl.
| | |
|---|---|
| *H01M 50/54* | (2021.01) |
| *B60L 50/64* | (2019.01) |
| *H01M 50/249* | (2021.01) |
| *H01M 50/46* | (2021.01) |
| *H01M 50/533* | (2021.01) |

(Continued)

(52) U.S. Cl.
CPC ............. *H01M 50/54* (2021.01); *B60L 50/64* (2019.02); *H01M 50/249* (2021.01); *H01M 50/46* (2021.01); *H01M 50/533* (2021.01); *H01M 50/534* (2021.01); *H01M 50/536* (2021.01); *H01M 2220/20* (2013.01)

(58) Field of Classification Search
CPC .. H01M 50/54; H01M 50/249; H01M 50/533; H01M 50/534; H01M 50/46; H01M 50/536; H01M 2220/20; B60L 50/64

USPC .......................................................... 429/161
See application file for complete search history.

(56) References Cited

U.S. PATENT DOCUMENTS

| | | | |
|---|---|---|---|
| 6,275,004 | B1 | 8/2001 | Tamai et al. |
| 7,507,498 | B2 | 3/2009 | Yoon et al. |
| 7,851,085 | B2 | 12/2010 | Obrovac et al. |

(Continued)

FOREIGN PATENT DOCUMENTS

| | | |
|---|---|---|
| CN | 219144259 U | 6/2023 |
| WO | 03041209 A2 | 5/2003 |

*Primary Examiner* — James M Erwin
(74) *Attorney, Agent, or Firm* — Quinn IP Law

(57) ABSTRACT

Presented are electrochemical devices with in-stack reference electrodes, methods for making/using such devices, and battery cells with stacked electrodes segregated by electrode separator assemblies having built-in reference electrodes. An electrochemical device includes a protective outer housing that contains an ion-conducting electrolyte. A stack of working electrodes is packaged inside the device housing in electrochemical contact with the electrolyte. At least one electrode separator assembly is located inside the housing, interposed between a neighboring pair of these working electrodes. The electrode separator assembly includes an electrically insulating separator sheet with a reference electrode. A tab pocket, which projects from an end of the separator sheet, includes a tab chamber with a chamber opening. An electrode tab is formed with an electrically conductive material and attached to the tab pocket. One end of the electrode tab is disposed in the tab chamber and the other end projects out from the chamber opening.

20 Claims, 4 Drawing Sheets

(51) Int. Cl.
　　*H01M 50/534*　　　(2021.01)
　　*H01M 50/536*　　　(2021.01)

(56) References Cited

U.S. PATENT DOCUMENTS

| | | | |
|---|---|---|---|
| 8,565,949 B2 | 10/2013 | Christman et al. | |
| 8,586,222 B2 | 11/2013 | Timmons et al. | |
| 9,028,565 B2 | 5/2015 | Huang | |
| 9,142,830 B2 | 9/2015 | Xiao et al. | |
| 9,142,980 B2 | 9/2015 | Lee | |
| 9,281,514 B2 | 3/2016 | Rhodes et al. | |
| 9,379,418 B2 | 6/2016 | Wang et al. | |
| 9,660,462 B2 | 5/2017 | Jeon | |
| 9,923,189 B2 | 3/2018 | Xiao | |
| 10,062,898 B2 | 8/2018 | Xiao | |
| 10,199,643 B2 | 2/2019 | Zhou et al. | |
| 10,367,201 B2 | 7/2019 | Yang et al. | |
| 10,388,959 B2 | 8/2019 | Dong et al. | |
| 10,424,784 B2 | 9/2019 | Yang et al. | |
| 10,435,773 B2 | 10/2019 | Liu et al. | |
| 10,446,884 B2 | 10/2019 | Yang et al. | |
| 10,511,049 B2 | 12/2019 | Yang et al. | |
| 10,566,652 B2 | 2/2020 | Dai et al. | |
| 10,573,879 B2 | 2/2020 | Yang et al. | |
| 10,593,988 B2 | 3/2020 | Xiao et al. | |
| 10,629,941 B2 | 4/2020 | Dai et al. | |
| 10,637,048 B2 | 4/2020 | Qi et al. | |
| 10,673,046 B2 | 6/2020 | Dadheech et al. | |
| 11,245,105 B2 | 2/2022 | Dadheech | |
| 11,525,742 B2 | 12/2022 | Zhang | |
| 2003/0151868 A1 | 8/2003 | Inae et al. | |
| 2009/0104510 A1* | 4/2009 | Fulop | H01M 10/0525 429/50 |
| 2011/0215767 A1 | 9/2011 | Johnson et al. | |
| 2011/0248675 A1 | 10/2011 | Shiu et al. | |
| 2012/0206296 A1 | 8/2012 | Wan | |
| 2013/0119935 A1 | 5/2013 | Sufrin-Disler et al. | |
| 2014/0152232 A1 | 6/2014 | Johnson et al. | |
| 2019/0126770 A1* | 5/2019 | Koch | B60L 58/12 |
| 2019/0280333 A1 | 9/2019 | Dahn et al. | |
| 2019/0280334 A1 | 9/2019 | Dahn et al. | |
| 2019/0312312 A1* | 10/2019 | Ensling | H01M 4/134 |
| 2019/0393546 A1 | 12/2019 | Dahn et al. | |
| 2021/0083257 A1* | 3/2021 | Riemer | C25D 5/022 |
| 2021/0091369 A1 | 3/2021 | Dadheech et al. | |
| 2021/0091424 A1 | 3/2021 | Gao et al. | |
| 2021/0218006 A1 | 7/2021 | Gao et al. | |
| 2021/0247242 A1* | 8/2021 | Zhang | G01K 7/22 |
| 2021/0273229 A1 | 9/2021 | Wang et al. | |
| 2022/0285747 A1 | 9/2022 | Gao | |
| 2023/0091154 A1 | 3/2023 | Gao et al. | |

* cited by examiner

ELECTROCHEMICAL DEVICES WITH MULTIFUNCTIONAL ELECTRODE SEPARATOR ASSEMBLIES HAVING BUILT-IN REFERENCE ELECTRODES

INTRODUCTION

The present disclosure relates generally to electrochemical devices. More specifically, aspects of this disclosure relate to stacked electrode assemblies with in-stack reference electrodes for lithium-class battery cells.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple types of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/group) into individual battery modules (e.g., 10-40+ modules/pack) that are electrically interconnected in series or parallel and mounted onto the vehicle chassis by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative rails of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are four primary types of batteries that are used in electric-drive vehicles: lithium-class batteries, nickel-metal hydride batteries, ultracapacitor batteries, and lead-acid batteries. As per lithium-class designs, lithium-metal and lithium-ion (secondary) batteries make up the bulk of commercial lithium battery (LiB) configurations, with lithium-ion (Li-ion) variants being employed in automotive applications due to their enhanced stability, high energy densities, and fast-recharging capabilities. A standard Li-ion cell is generally composed of at least two conductive electrodes, an electrolyte material, and a permeable separator, all of which are enclosed inside an electrically insulated packaging. One electrode serves as a positive ("cathode") electrode and the other electrode serves as a negative ("anode") electrode during cell discharge. The separator—oftentimes a microporous polymeric membrane—is disposed between the two electrodes to prevent electrical short circuits while also allowing the transport of ionic charge carriers. The electrolyte is suitable for conducting lithium ions and may be in solid form (e.g., solid state diffusion), liquid form (e.g., liquid phase diffusion), or quasi-solid form (e.g., solid electrolyte entrained within a liquid carrier). Rechargeable Li-ion batteries operate by reversibly passing lithium ions back and forth between these working electrodes.

SUMMARY

Presented herein are electrochemical devices with in-stack reference electrodes, methods for manufacturing and methods for operating such devices, and lithium-class battery cells with stacked working electrodes segregated by electrode separator assemblies having built-in reference electrodes. By way of example, a pouch-type lithium-ion battery cell contains an electrode stack with a succession of first (anode) working electrodes interleaved with a like number of second (cathode) working electrodes. An electrically insulating and ionically conductive separator, which may be in the nature of a polymeric separator sheet immersed in liquid electrolyte or bonded to solid electrolyte, is disposed between each pair of neighboring electrodes. The interleaved electrodes and separator sheets may be stacked and housed in a protective pouch, jelly rolled and housed in a cylindrical can, or flat rolled and housed in a prismatic container. A reference electrode may be baked into or otherwise integrally formed with the separator sheet.

One or more of these electrode separator sheets may be fabricated as a multifunctional separator assembly with an electrically conductive reference electrode tab that protrudes from a tab pocket projecting longitudinally from an end of the separator sheet. The tab pocket may include a reduced-width tab panel that is coplanar and integrally formed with the separator sheet's main body. Projecting transversely from one side of the tab panel is an integral tab flap that folds against the tab panel to form a compartment within which is rigidly secured the reference electrode tab. To operatively attach the reference electrode tab to the separator sheet may include cleaning and roughing a first (proximal) end of the tab; an electrically conductive adhesive is applied to both sides of the tab's proximal end. One side of the tab is aligned with and pressed against the tab panel; the tab flap is then folded against and adhered to the opposite side of the tab.

Once attached, at least approximately 50% of the tab projects from the tab pocket with the proximal end thereof spaced from the longitudinal end of the separator sheet.

Attendant benefits for at least some of the disclosed concepts include functional separator assemblies that enable in-stack measurement of electrode electrical characteristics while ensuring electrical and thermal separation of neighboring working electrodes. By measuring electrode electrical characteristics using in-stack reference electrodes, disclosed concepts help to detect potential battery failure and control battery operation in an optimized manner. Disclosed separator assembly features also help to decrease packaging space requirements and reduce manufacturing complexity for reference electrodes and their conductive tabs. In addition to improved battery cell monitoring and operation, disclosed concepts may help to increase driving range, fuel economy, and pack performance for electric-drive vehicles.

Aspects of this disclosure are directed to electrochemical devices, such as cylindrical, pouch, and prismatic LiB cells that are used, for instance, in the battery modules of vehicular traction battery packs. In an example, an electrochemical device is constructed with an insulated and sealed housing for storing therein an electrolyte composition that is chemically configured to conduct ions. An electrode stack, which is located inside the device housing in electrochemical contact with the electrolyte, includes one or more first (e.g., anode) working electrodes interleaved with one or more second (e.g., cathode) working electrodes. At least one electrode separator assembly is located inside the device housing, interposed between and physically separating a neighboring pair of the working electrodes. Each electrode separator assembly includes a separator sheet that is formed, in whole or in part, from an electrically insulating material. The separator sheet includes a reference electrode. A tab pocket, which projects from one end of the separator sheet, includes a tab chamber with a chamber opening. An electrically conductive reference electrode tab is attached to the tab pocket and electrically connected to the reference electrode. One end of the reference electrode tab is disposed inside the tab chamber and the other end of the electrode tab projects out from the chamber opening.

Additional aspects of this disclosure are directed to lithium-class battery cells with stacked electrode assemblies having in-stack sensing capabilities, rechargeable battery packs employing such lithium-class battery cells, and motor vehicles equipped with such battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, e-bikes, e-scooters, watercraft, aircraft, etc. For non-automotive applications, disclosed concepts may be implemented for any logically relevant use, including stand-alone power stations and portable power packs, photovoltaic systems, handheld electronic devices, pumping equipment, machine tools, appliances, etc. While not per se limited, disclosed concepts may be particularly advantageous for use in lithium-metal (secondary) cylindrical, pouch, and prismatic can cells.

In an example, a motor vehicle includes a vehicle body with a passenger compartment, multiple drive wheels rotatably mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s).

Continuing with the discussion of the preceding example, the traction battery pack contains multiple lithium-class battery cells, e.g., stacked within one or more battery modules and/or arrayed in a battery pack housing. Each battery cell is fabricated with a protective battery housing that stores therein a liquid, solid, or quasi-solid electrolyte composition for conducting ions. An electrode stack is located inside the battery housing in electrochemical contact with the electrolyte. The electrode stack includes a series of first (anode) working electrodes that is interleaved with a corresponding number of second (cathode) working electrodes. Also located inside the battery housing is an electrode separator assembly that is interposed between a respective pair of the working electrodes. The electrode separator assembly includes a separator sheet that is formed, in whole or in part, from an electrically insulating material, and a tab pocket that is integral with and projects from a longitudinal end of the separator sheet. A reference electrode is borne by the separator sheet. The tab pocket includes an internal tab chamber with a chamber opening at one end thereof. A reference electrode tab is rigidly attached, e.g., via an electrically conductive adhesive, to the tab pocket and formed, in whole or in part, from an electrically conductive material. The reference electrode tab has a first (proximal) end that is disposed inside the tab chamber and a second (distal) end, opposite the first end, that projects out from the chamber opening.

Aspects of this disclosure are also directed to manufacturing processes, control logic, and computer-readable media (CRM) for making and/or using any of the disclosed electrochemical devices, battery packs, and/or vehicles. In an example, a method is presented for assembling an electrochemical device. This representative method includes, in any order and in any combination with any of the above and below disclosed options and features: receiving a device housing of the electrochemical device; locating an electrolyte inside the device housing, the electrolyte being configured to conduct ions; locating an electrode stack inside the device housing in electrochemical contact with the electrolyte, the electrode stack including first and second working electrodes; and locating an electrode separator assembly between the first and second working electrodes, the electrode separator assembly including: a separator sheet formed with an electrically insulating material and including a reference electrode; a tab pocket projecting from an end of the separator sheet and defining a tab chamber with a chamber opening; and an electrode tab attached to the tab pocket and formed with an electrically conductive material, the electrode tab having a first end disposed in the tab chamber and a second end projecting out from the chamber opening.

For any of the disclosed vehicles, methods, and devices, the tab pocket may include a tab panel that projects from and is coplanar with the separator sheet. In this instance, the separator sheet may have a sheet (first) width and height, whereas the tab panel may have a panel (second) width and height that are less than the sheet's width and height, respectively. The tab pocket may also include a tab flap that projects from one side of the tab panel; the tab flap may be pressed against and rigidly attached to the tab panel to collectively define therebetween the tab chamber. In this instance, the tab flap may have a flap (third) height that is less than the height of the separator sheet and the height of the tab panel. For simplicity of design and manufacture, it may be desirable that the separator sheet and the tab pocket, including the tab flap and tab panel, be integrally formed from the electrically insulating material as a unitary, single-piece structure. As another option, the separator sheet, tab flap, and tab panel may each have a distinct polyhedral shape (e.g., square or rectangular polyhedron) with a distinct size (e.g., total surface area).

For any of the disclosed vehicles, methods, and devices, the reference electrode tab may be rigidly attached to the tab pocket via an electrically conductive adhesive. As a further option, the reference electrode tab may have a substantially flat, rectangular tab body with one (first) side thereof having a panel-facing (first) surface that is finished with a non-smooth surface texture. On this opposite side of the tab body is another (second) side thereof having a flap-facing (second) surface that may also be finished with the non-smooth surface texture. In this instance, the electrically conductive adhesive may be located on one or both of the tab body surfaces with the non-smooth surface texture. In this instance, the non-smooth surface texture may include dimples, scoring lines, cross-hatched grooves, sinusoidal grooves, horizontal grooves, and/or angled grooves.

For any of the disclosed vehicles, methods, and devices, the reference electrode tab may be formed, in whole or in part, from gold, gold-plated plastic, aluminum, nickel, copper, copper-plated aluminum, stainless steel, etc. As another option, the electrically conductive adhesive may be an air-cured, heat-cured, and/or UV-cured adhesive, may include a filler material, a conductive additive material, and/or a binder material, and may have an epoxy base, an acrylate base, and/or a silicone base. Optionally, the reference electrode tab may include an elongated tab body with at least 50% of the tab body projecting out from the chamber opening. It may be desirable that the proximal (first) end of the reference electrode tab, which is disposed inside the tab chamber, be spaced from the end of the separator sheet from which projects the tab pocket.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
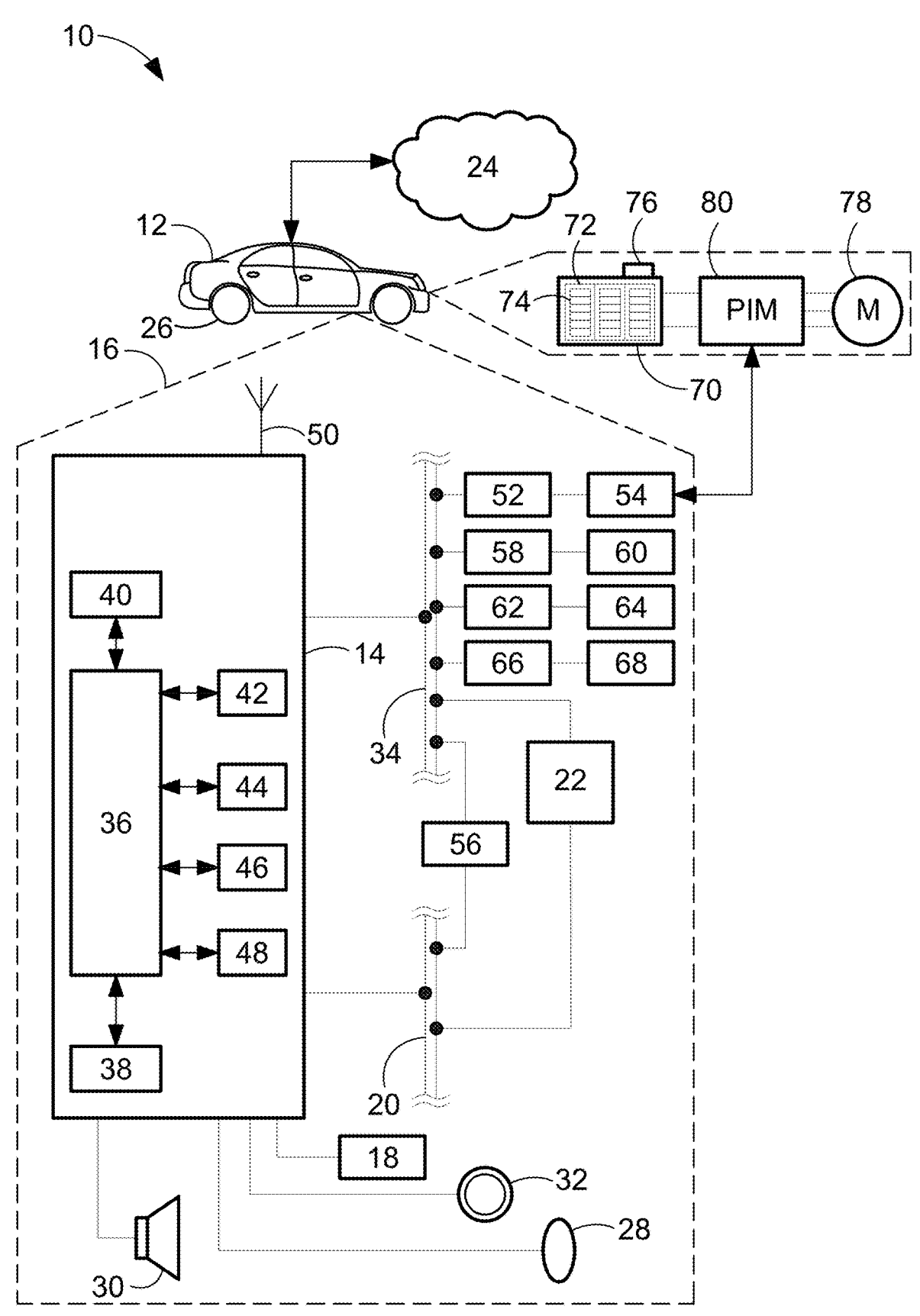
FIG. 1 is a partially schematic, side-view illustration of a representative motor vehicle propelled by an electrified powertrain with a motor generator unit powered by a traction battery pack containing battery cells with in-stack reference electrodes in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, recitation of "first", "second", "third", etc., in the specification or claims is not used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including." "containing," "comprising," "having." and the like, shall each mean "including without limitation." Moreover, words of approximation, such as "about." "almost." "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other electrochemical device form factors, may be incorporated into any logically relevant type of motor vehicle, and may be utilized for both automotive and non-automotive applications alike. Moreover, only select components of the motor vehicles and battery assemblies are shown and described in additional detail herein. Nevertheless, the vehicles and assemblies discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables vehicle hardware 16 to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, telematics unit 14 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication component, a navigation and location component (e.g., global positioning system (GPS) transceiver), or a wireless modem, all of which are collectively represented at 44. Short-range communication (SRC) may be provided via a close-range wireless communication device 46 (e.g., a BLU-ETOOTH® unit), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as a polyphase, permanent magnet motor/generator (M) unit 78, draw electrical power from and, optionally, deliver electrical power to the battery pack 70. An HV electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

Figure 2:
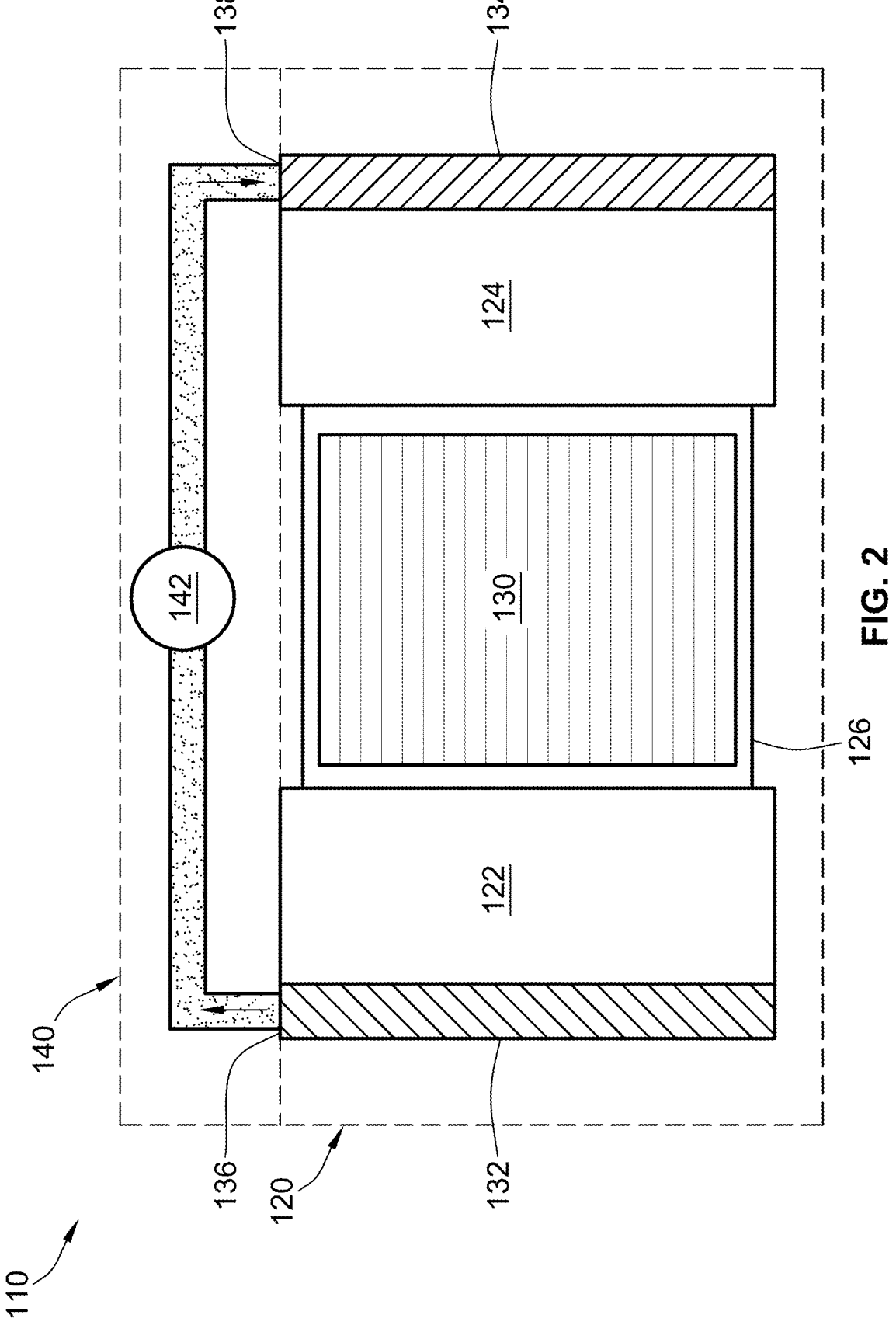
FIG. 2 is a schematic illustration of a representative electrochemical device with which aspects of the present disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. In at least some configurations, the cell housing 120 (or "cell case") may take on a can-like cylindrical construction, an envelope-like pouch construction, or a box-like prismatic construction that is formed of aluminum, nickel-plated steel, ABS, PVC, or other suitable material or composite material. The surfaces of a metallic cell case may be coated with a polymeric finish to insulate the metal from internal cell elements and from adjacent cells. Although FIG. 2 illustrates a single galvanic monocell unit enclosed within the cell housing 120, it should be appreciated that the housing 120 may store a stack or roll of monocell units (e.g., five to 500 cells or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio (as indicated by an atomic percent (at. %) of one type of atom relative to a total number of atoms) in a range from 0 at. %≤Li/Al<70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fc, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the battery cell housing 120 of FIG. 2 and sandwiched between each mated pair of working electrodes 122, 124 is an electrically isolating porous separator 126. The porous separator 126 may be in the nature of an electrically non-conductive, ion-transporting microporous or nanoporous polymeric separator sheet. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition, a solid electrolyte composition, and/or a quasi-solid electrolyte composition, collectively designated 130, which may also be present in the negative electrode 122 and the positive electrode 124.

A negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system, battery 110 generates electric current that is transmitted to one or more loads 142 operatively connected to the external circuit 140. While the load 142 may be any number of electric devices, a few non-limiting examples of power-consuming and power-generating devices include electric motors for hybrid-electric and full-electric vehicles, photovoltaic cell arrays, standalone power stations and portable power packs, server systems, wind turbine farms, etc. The battery 110 may include a variety of other components that, while not depicted herein for simplicity and brevity, are nonetheless readily available. For instance, the battery 110 may include one or more gaskets, terminal caps, tabs, battery terminals, cooling hardware, charging hardware, and other commercially available components or materials that may be situated on or in the battery 110. Moreover, the size and shape and operating characteristics of the battery 110 may vary depending on the particular application for which it is designed.

Presented herein are multifunctional electrode separator assemblies with robust and compatible reference electrode connection designs that enable the passing of current through the separator sheet for measuring and controlling working electrode potential. The separator assembly employs a folded "sandwich-style" tab pocket with an electrically conductive adhesive for securely attaching and operatively connecting a reference electrode tab to the separator sheet. This space-efficient tab connection solution uses a flexible-substrate tab pocket with a panel that is integrally formed with and projects longitudinally from a top end of the separator sheet. A foldable tab flap structure projects transversely from a lateral side of this tab panel; the tab flap is folded across and adhered to the tab panel to create a pocket with a double-sided joining area that significantly increases peel fatigue strength and fracture strength. In addition to helping prevent peel failure, this tab pocket design may also increase (e.g., double) the contact interface area between the reference electrode tab and the separator sheet to resist shear fracture.

Also presented herein are simplified and efficient manufacturing processes for fabricating multifunctional separator assemblies with built-in reference electrodes. In an example, a manufacturing process for assembling a multifunctional electrodes separator may start with stamping, cutting, or forming an electrically conductive workpiece from a metal blank or sheet metal feed roll, and then executing a surface preparation procedure for roughing the bottom 40-65% of the front and rear faces of the workpiece. After applying the aforesaid surface texture, the workpiece may be cleaned and, if desired, may go through other preprocessing procedures. At this juncture, a conductive adhesive is applied to the texturized portions of the front and rear faces of the workpiece, which may be achieved by masking, knife smear, and/or air blow. The texturized and coated workpiece is then pressed against the panel or flap portion of the tab pocket projecting from the separator sheet. The tab flap is concurrently folded onto the tab panel to rigidly mount the electrode tab to the separator sheet and form the tab pocket that envelops at least the lower half of the electrode tab.

As noted above, the separator sheet may be fabricated as a unitary, one-piece microporous or nanoporous structure that is formed from an electrically non-conductive, ion-transporting material, such as a polyolefin (e.g., polyethylene (PE), polypropylene (PP), or a blend of PE and PP), or may be a multi-layered structure, such as laminated porous films of PE and/or PP. The tab material may include, but is certainly not limited to: gold (Au), gold-plated plastic, aluminum (Al), nickel (Ni), copper (Cu), copper-plated aluminum, stainless steel, etc. In contrast, the conductive adhesive material may include, but is certainly not limited to: an air-cured conductive adhesive, a heat-cured conductive adhesive, a UV-cured conductive adhesive, which may include an electrode binder material, a conductive additive, and/or a blend of conductive particles and epoxy, etc. Disclosed separator assembly designs may help to reduce packaging space requirements for the electrode tab which, in turn, reduces the overall size and weight of the electrochemical device. Other attendant advantages may include reducing the fabrication complexity and processing time for making/using multifunctional separator assemblies.

Figure 3:
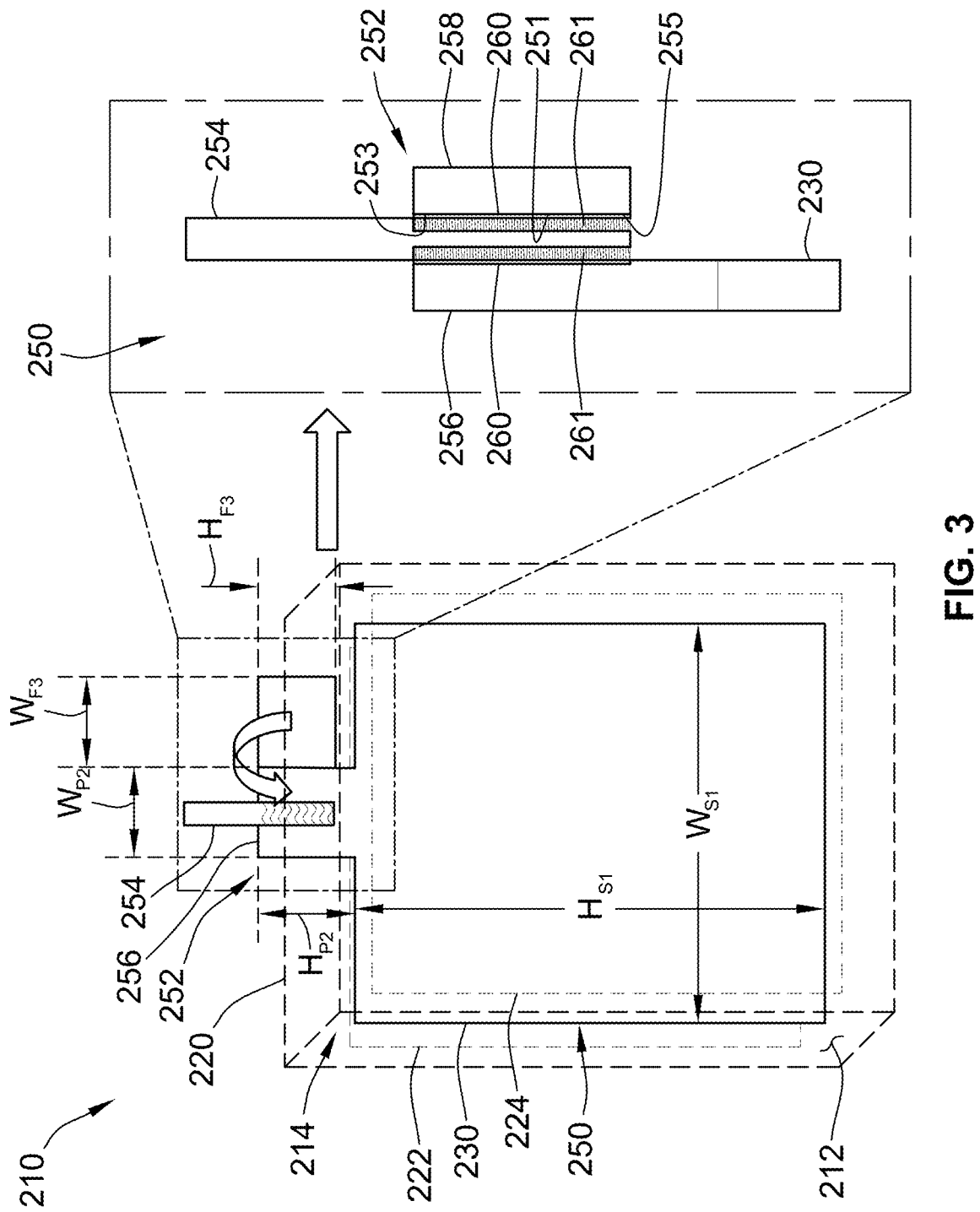
FIG. 3 is a plan-view illustration of a representative multifunctional electrode separator assembly with a built-in reference electrode for an electrode stack of an electrochemical device in accord with aspects of the present disclosure.

Turning next to FIG. 3, there is shown another non-limiting example of an electrochemical device that is portrayed as a rechargeable battery assembly 210 for storing and supplying high-voltage electrical energy used, for example, to propel an electric-drive vehicle, such as the FEV automobile 10 of FIG. 1. This battery assembly 210 may be part of a deep-cycle, high-ampere capacity vehicle battery system that is rated for approximately 350 to 1200 high-voltage direct current (HVDC) or more, for example, depending on a desired vehicle range, gross vehicle weight, and power ratings of the various accessory loads drawing electrical power from the RESS. Although differing in appearance, it is envisioned that any of the features and options described above with reference to the battery pack 70 of FIG. 1 and the lithium-class battery cell 110 of FIG. 2 can be incorporated, singly or in any combination, into the battery assembly 210 of FIGS. 3 and 4, and vice versa.

As a representative point of similarity to the battery pack 70 of FIG. 1 and the battery 110 of FIG. 2, the battery assembly 210 of FIG. 3 may include a liquid-tight, electrically insulated battery assembly housing 220 (also referred to as "device housing") for storing therein an electrolyte 212 material that is chemically configured to conduct ions (e.g., lithium hexafluorophosphate (LiPF6) in an organic solution). Also packaged inside the device housing 220, in electrochemical contact with the electrolyte 212, is an electrode stack 214 composed of one or more (first) working electrodes 222 interleaved with and juxtaposed in face-to-face relation to one or more (second) working electrodes 224. While portrayed in FIG. 3 with a single pair of working electrodes, each electrochemical device may include multiple electrode pairs (e.g., 10-20 or more) that are stacked and connected in parallel or series for storing and supplying electrical energy.

Inserted between the two neighboring electrodes 222, 224 is an electrode separator assembly 250 that is likewise disposed inside the device housing 220 in electrochemical contact with the electrolyte 212. For device configurations incorporating multiple mated pairs of opposite-polarity electrodes, a respective electrode separator assembly 250 may be sandwiched between one, some, or all mated pairs. According to the illustrated example, the electrode separator assembly 250 may include or, if desired, may consist essentially of a separator sheet 230, a tab pocket 252 projecting from a top end of the separator sheet 230, and a reference electrode tab 254 (also referred to herein as "electrode tab") securely attached to the tab pocket 252. The separator sheet 230 of FIGS. 3 and 4 may be similar or identical in construction to the porous separator 126 of FIG. 2 and, thus, may include any of the corresponding features and options thereof, including being formed, in whole or in part, from an electrically insulating yet porous material.

Figure 4:
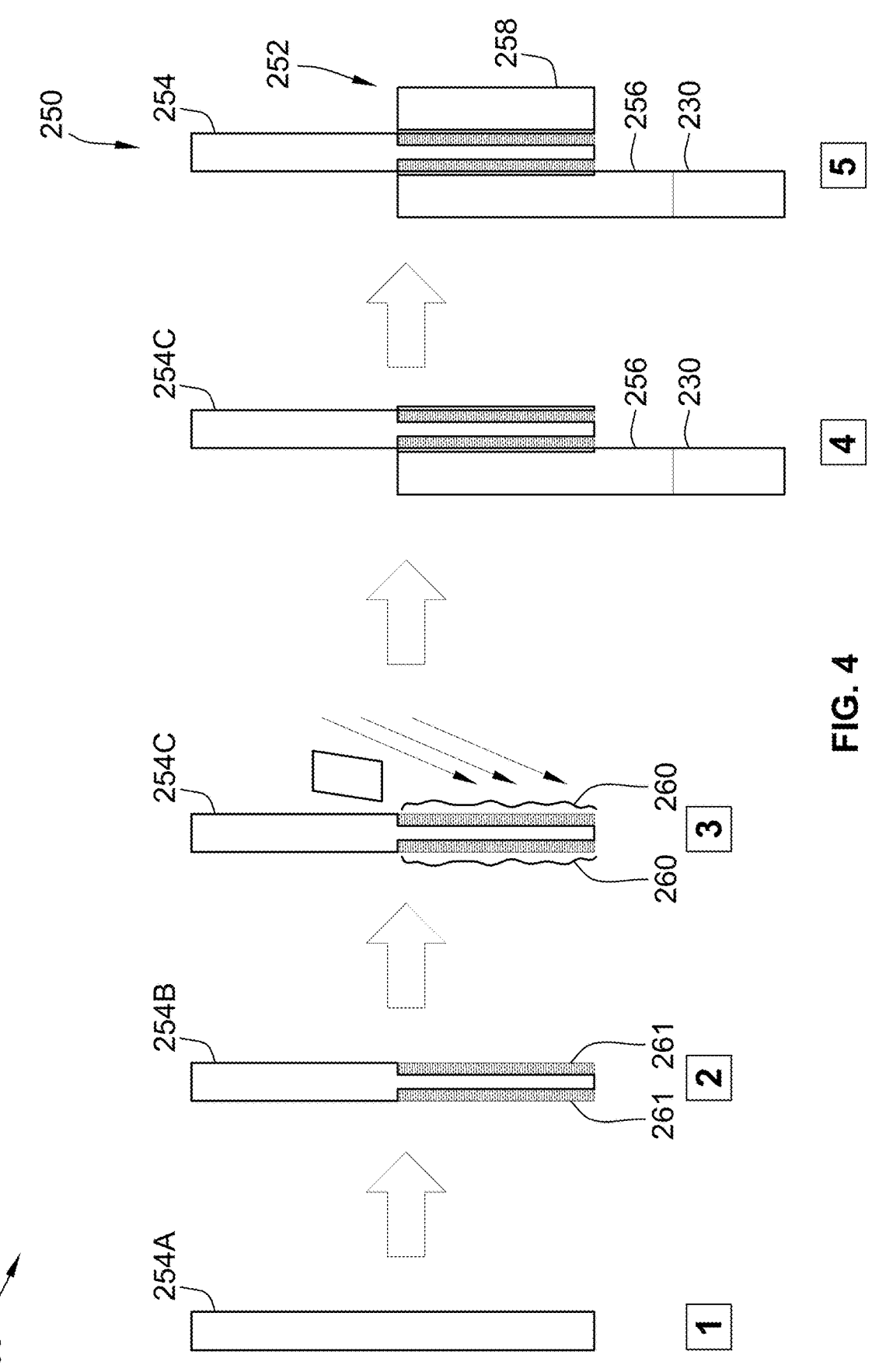
FIG. 4 is a workflow diagram illustrating a representative method for manufacturing an electrode separator assembly with a built-in reference electrode in accord with aspects of the present disclosure.

As a point of demarcation from the separator 126 of FIG. 2, the separator sheet 230 of FIGS. 3 and 4 may include a reference electrode. As shown, the reference electrode may be borne by or otherwise integrally formed with the separator sheet 230 (and thus is not identified with a separate reference number). For instance, a dried, electrically conductive electrode material may be pressed on then baked into one surface of the sheet 230 to form a reference electrode. The reference electrode may be formed, in whole or in part, from an electrically conductive material in a manner similar to the two working electrodes 122, 124 of FIG. 2; however, the reference electrode tab 254 may be distinct in shape, size, and function to the working electrodes 122, 124.

With continuing reference to the representative electrochemical device of FIG. 3, the tab pocket 252 may be fabricated with a pre-assembly "L-shaped" construction that is typified by a tab panel 256 that projects longitudinally from and is coplanar with the separator sheet 230, and a tab flap 258 that is coplanar with and projects transversely from a lateral (right-hand) side of the tab panel 256. After assembly, the tab pocket 252 may have an "I-shaped" construction in which the tab flap 258 is folded across, pressed against, and rigidly attached to the tab panel 256 to collectively define therebetween a tab chamber 251, as best seen in the inset view of FIG. 3. It may be desirable that both the top and bottom ends of the tab chamber 251 have respective chamber opening 253 and 255 (as shown); alternatively, only the top end of the chamber 251 may have a respective opening 253. For ease of fabrication and assembly, it may be desirable that the separator sheet 230 and the tab pocket 252, including both the tab panel 256 and the tab flap 258, be integrally formed from the same electrically insulating material as a unitary, single-piece structure.

According to the illustrated example, the separator sheet 230, the tab panel 256, and the tab flap 258 may each have a respective polyhedral shape with a respective size. By way of non-limiting example, the sheet 230, panel 256, and flap 258 may each be a rectangular polyhedron (prism) with a distinct width-to-height ratio and a distinct total surface area on the opposing major faces thereof. As shown, the separator sheet 230 has a sheet (first) width $W_{S1}$ and a sheet (first) height $H_{S1}$, whereas the tab panel 256 has a panel (second) width $W_{P2}$, which is less than the sheet width $W_{S1}$, and a panel (second) height $H_{P2}$, which is less than the sheet height $H_{S1}$. Comparatively, the tab flap has a flap (third) width $W_{F3}$ and a flap (third) height $H_{F3}$; the flap width $W_{F3}$ is less than the sheet width $W_{S1}$ and may be approximately equal to or less than the panel width $W_{P2}$; and the flap height $H_{F3}$ is less than the sheet height $H_{S1}$ and may be less than or approximately equal to the panel height $H_{P2}$. It should be appreciated that the sheet 230, panel 256, and flap 258 may take on other regular and irregular shapes and, if desired, may take on other individual and relative dimensions to that which are shown in the drawings.

The reference electrode tab 254 is shown in FIGS. 3 and 4 directly mounted to the tab pocket 252 and indirectly mounted, via the tab pocket 252, to the separator sheet 230. A bottom (first) end portion of the reference electrode tab 254 may be rigidly secured inside the tab chamber 251, whereas a top (second) end portion of the reference electrode tab 254 may project through the opening 253 in the top end of the tab chamber 251. Optionally, a proximal tip at the bottom end of the reference electrode tab 254 may be exposed through the opening 255 in the bottom end of the tab chamber 251. In accord with the illustrated example, the reference electrode tab 254 includes an elongated, rectangular tab body, at least 50% of which may project out from the chamber opening 253. Alternatively, 55%-75% of the rectangular tab body may be disposed inside the tab chamber 251 to help ensure a secure attachment between the reference electrode tab 254 and the tab pocket 252. As yet a further option, the bottom (first) end of the reference electrode tab 254 that is disposed inside the tab chamber 251 may be spaced a predefined distance (e.g., approximately 2 mm-10 mm gap) from the top end of the separator sheet 230, e.g., to ensure the electrode tab 254 does not interfere with ion flow through the sheet 230. Moreover, the bottom end of the tab body may take on other geometries, such as an enlarged rectangle or a circle, to increase the contact area between the electrode tab 254 and pocket 252.

To help ensure a secure attachment between the electrode tab 254 and pocket 252, the reference electrode tab 254 may be rigidly attached to the tab pocket 252 via an electrically conductive adhesive 260. The conductive adhesive 260 layers may take on any of the herein-described options, including air-cured, heat-cured, and UV-cured conductive adhesives, conductive additives contained an electrode binder material, conductive additives with a blend of conductive particles entrained in epoxy. The inset view of FIG. 3, for example, shows the reference electrode tab 254 with a pair of opposing (first/front and second/back) sides; the front side has a lower (first/front) surface and the back side has a lower (second/back) surface, both of which are located inside tab pocket 252. One or both of these surfaces may be machined or formed to include a non-smooth surface texture 261. The electrically conductive adhesive 260 may be applied to the reference electrode tab 254 so that it is located on and substantially covers the surface texture 261 on the front and/or back surfaces. The surface texture 261 may take on any suitable surface texture treatment that will enhance adhesion with the electrically conductive adhesive 260, such as dimples, scoring lines, cross-hatched grooves, sinusoidal grooves, horizontal grooves, and/or angled grooves. The surface texture may be imparted in two levels, a surface profile level and a roughness level. For the profile level, the texturization may be linear score lines, crosshatch lines, dimples, etc., in the submillimeter mm size. For the roughness level, the texturization may have an average roughness (Ra) height of at least 0.5 micrometers (um) and a Developed Interfacial Area Ratio (Sdr) of at least 50%.

Once constructed, the electrode separator assembly 250 may be sandwiched between the two working electrodes 222, 224; in so doing, the separator sheet 230 may physically separate the three electrodes 222, 224, 254 (anode, cathode, and reference electrodes). By mounting the reference electrode tab 254 onto the tab pocket 252—a flexible surface extension of the non-conductive separator sheet 230—the separator sheet 230 substrate may also act as electrical insulation for the reference electrode tab 254. The reference electrode tab 254 has a predefined "stable" potential and, thus, may be paired with either of the working electrodes 222, 224 to measure the voltage across the paired electrodes (e.g., cathode/reference or anode/reference). In so doing, a battery system controller is able to measure an absolute potential of the paired electrodes based on the predefined potential of the reference electrode tab 254. It is envisioned that disclosed multifunctional separator designs are not limited to referent electrodes and may also be applied to other electrodes.

FIG. 4 presents a workflow diagram that illustrates a representative method 300 for manufacturing electrode separator assemblies with built-in reference electrodes. Some or all of the operations illustrated in FIG. 4 and described in further detail below may be representative of an algorithm that corresponds to non-transitory, processor-executable instructions that may be stored, for example, in main or auxiliary or remote memory and executed, for example, by an electronic controller, processing unit, dedicated control module, logic circuit, or other module or device or network of modules/devices to perform any or all of the above and below described functions associated with the disclosed concepts. It should be recognized that the order of execution of the illustrated operation blocks may be changed, additional operation blocks may be added, and some of the herein described operations may be modified, combined, or eliminated. While aspects of the present disclosure are discussed in the context of rectangular-shaped separator sheets and electrode tabs, persons skilled in the art will appreciate that the present disclosure is applicable to workpieces of about any size, shape, and cross section.

Method 300 may begin with processor-executable instructions executed by a programmable controller or control module or similarly suitable processor to call up an initialization procedure for a closed-loop control sequence for performing the various illustrated operations. Initial stages of the manufacturing process may comprise supplying, accessing, fabricating, and/or utilizing (collectively "providing") the various materials, tools, and machines needed to manufacture the electrode separator assemblies. Additional control commands, tolerances, and parameters may be entered at this juncture prior to commencement of a desired assembly operation. Upon completion of any requisite preliminary procedures, method 300 advances to a first process step (1) for stamping, cutting, or otherwise fabricating an electrically conductive workpiece 254A from a metal blank, sheet metal feed roll, or metal-coated plastic substrate.

Method 300 thereafter proceeds to a second process step (2) for applying a non-smooth surface texture to one or more select portions of one or more major faces of the workpiece 254A to generate a texturized workpiece 254B. As noted above, a bottom portion (e.g., approximately 40-65%) of the front and/or rear faces of the workpiece 254A may be roughened with score lines, channels, recessed grooves, etc. At this juncture, the texturized workpiece 254B may be cleaned and may go through other metal preprocessing procedures (e.g., overflow free-rinse, polish, airdry, etc.). Advancing to a third process step (3), method 300 applies an adhesive to select portions of the texturized and cleaned workpiece 254B to define a coated workpiece 254C. After masking the non-roughened surface(s) of the texturized workpiece 254B, e.g., with low-tac, pressure-sensitive adhesive (PSA) tape, an electrically conductive adhesive may be applied, e.g., by knife smear or air blow, to the roughened surface(s) of the texturized workpiece 254B.

With continuing reference to FIG. 4, method 300 continues to a fourth process step (4) for attaching the adhesive-coated workpiece 254C to an electrically insulating, ionically conductive separator sheet. As shown, the texturized and coated workpiece 254C is pressed against a tab panel 256 portion (or a tab flap 258 portion) of a tab pocket 252 extending coplanar from one end of a separator sheet 230. The workpiece 254C is placed such that it electrically connects, e.g., via the electrically conductive adhesive, to a reference electrode borne by the separator sheet 230. Method 300 then executes a fifth process step (5) to form a tab pocket around and thereby operatively secure the workpiece 254C to the separator. For instance, FIG. 4 portrays the tab flap 258 being folded onto and pressed against the tab panel 256; in so doing, the electrically conductive adhesive 260 rigidly attaches the electrode tab 254 to both the panel 256 and flap 258 and concomitantly forms the tab pocket 252 that envelops at least the lower half of the electrode tab 254.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electrochemical device, comprising:
a device housing;
an electrolyte located inside the device housing and configured to conduct ions;
an electrode stack located inside the device housing and including first and second working electrodes in electrochemical contact with the electrolyte; and
an electrode separator assembly interposed between the first and second working electrodes, the electrode separator assembly including:
a separator sheet formed with an electrically insulating material and including a reference electrode;
a tab pocket projecting from an end of the separator sheet and defining a tab chamber with a chamber opening; and
an electrode tab attached to the tab pocket and formed with an electrically conductive material, the electrode tab having a first end disposed in the tab chamber and a second end projecting out from the chamber opening.

2. The electrochemical device of claim 1, wherein the tab pocket includes a tab panel projecting from and coplanar with the separator sheet, the separator sheet having a first width and a first height and the tab panel having a second width and a second height less than the first width and the first height, respectively.

3. The electrochemical device of claim 2, wherein the tab pocket further includes a tab flap projecting from one side of the tab panel, the tab flap being pressed against and rigidly attached to the tab panel to collectively define therebetween the tab chamber.

4. The electrochemical device of claim 3, wherein the tab flap has a third height less than the first height of the separator sheet and the second height of the tab panel.

5. The electrochemical device of claim 3, wherein the separator sheet and the tab pocket, including the tab flap and the tab panel, are integrally formed as a single-piece structure with the electrically insulating material.

6. The electrochemical device of claim 3, wherein the separator sheet, the tab flap, and the tab panel each has a respective polyhedral shape with a distinct size.

7. The electrochemical device of claim 1, wherein the electrode tab is rigidly attached to the tab pocket via an electrically conductive adhesive.

8. The electrochemical device of claim 7, wherein the electrode tab has a first side with a first surface including a non-smooth surface texture, wherein the electrically conductive adhesive is located on the first surface with the non-smooth surface texture.

9. The electrochemical device of claim 8, wherein the electrode tab has a second side, opposite the first side, with a second surface including the non-smooth surface texture, wherein the electrically conductive adhesive is further located on the second surface with the non-smooth surface texture.

10. The electrochemical device of claim 9, wherein the non-smooth surface texture includes dimples, scoring lines, cross-hatched grooves, sinusoidal grooves, horizontal grooves, and/or angled grooves.

11. The electrochemical device of claim 7, wherein the electrode tab is formed with gold, gold-plated plastic, aluminum, nickel, and/or stainless steel, and wherein the electrically conductive adhesive is air-cured, heat-cured, and/or UV-cured, includes a filler, conductive additive and/or binder material, and has an epoxy, acrylate, and/or silicone base.

12. The electrochemical device of claim 1, wherein the electrode tab includes an elongated tab body with at least 50% of the elongated tab body projecting out from the chamber opening.

13. The electrochemical device of claim 1, wherein the first end of the electrode tab disposed in the tab chamber is spaced from the end of the separator sheet from which projects the tab pocket.

14. A motor vehicle, comprising:
a vehicle body;
a plurality of road wheels attached to the vehicle body;
a traction motor attached to the vehicle body and operable to drive one or more of the road wheels to thereby propel the motor vehicle; and
a traction battery pack attached to the vehicle body and operable to power the traction motor, the traction battery pack containing a plurality of lithium-class battery cells, each of the lithium-class battery cells including:
a battery housing;
an electrolyte enclosed inside the battery housing and configured to conduct ions;

an electrode stack enclosed inside the battery housing in electrochemical contact with the electrolyte, the electrode stack including a first working electrode in spaced facing relation with a second working electrode; and an electrode separator assembly interposed between the first and second working electrodes, the electrode separator assembly including:

a separator sheet formed with an electrically insulating material and including a reference electrode;

a tab pocket integral with and projecting from an end of the separator sheet, the tab pocket defining therein a tab chamber with a chamber opening; and an electrode tab rigidly attached via an electrically conductive adhesive to the tab pocket and formed with an electrically conductive material, the electrode tab having a first end disposed in the tab chamber and a second end projecting out from the chamber opening.

15. A method of assembling an electrochemical device, the method comprising:

receiving a device housing of the electrochemical device;

locating an electrolyte inside the device housing, the electrolyte being configured to conduct ions;

locating an electrode stack inside the device housing in electrochemical contact with the electrolyte, the electrode stack including first and second working electrodes; and locating an electrode separator assembly between the first and second working electrodes, the electrode separator assembly including:

a separator sheet formed with an electrically insulating material and including a reference electrode;

a tab pocket projecting from an end of the separator sheet and defining a tab chamber with a chamber opening; and an electrode tab attached to the tab pocket and formed with an electrically conductive material, the electrode tab having a first end disposed in the tab chamber and a second end projecting out from the chamber opening.

16. The method of claim 15, wherein the tab pocket includes a tab panel projecting from and coplanar with the separator sheet, the separator sheet having a first width and a first height and the tab panel having a second width and a second height less than the first width and the first height, respectively.

17. The method of claim 16, wherein the tab pocket further includes a tab flap projecting transversely from one side of the tab panel, the method further comprising:

folding the tab flap to press against the tab panel; and rigidly attaching the tab flap to the tab panel to collectively define therebetween the tab chamber.

18. The method of claim 17, further comprising integrally forming the separator sheet and the tab pocket from the electrically insulating material as a single-piece structure.

19. The method of claim 15, further comprising rigidly attaching the electrode tab to the tab pocket via an electrically conductive adhesive.

20. The method of claim 19, further comprising:

applying a non-smooth surface texture to a surface of the electrode tab; and applying the electrically conductive adhesive onto the surface of the electrode tab to thereby cover the non-smooth surface texture.

* * * * *